United States Patent [19]

Kilstofte

[11] Patent Number: 4,630,152

[45] Date of Patent: Dec. 16, 1986

[54] MECHANICAL DRIVE MECHANISM FOR THE RECORD/PLAYBACK HEAD AND PINCH ROLLER OF A CASSETTE-TYPE TELEPHONE ANSWERING MACHINE

[75] Inventor: Richard B. Kilstofte, Long Beach, Calif.

[73] Assignee: T.A.D. Avanti, Inc., Compton, Calif.

[21] Appl. No.: 738,277

[22] Filed: May 28, 1985

Related U.S. Application Data

[63] Continuation of Ser. No. 572,835, Jan. 23, 1984, abandoned.

[51] Int. Cl.$^4$ .................. G11B 5/54; G11B 21/22; F16H 55/17
[52] U.S. Cl. .................. 360/105; 360/137; 74/435
[58] Field of Search .................. 360/105, 106, 137; 74/435, 384

[56] References Cited

U.S. PATENT DOCUMENTS

| | | | |
|---|---|---|---|
| 4,003,267 | 1/1977 | Busch | 74/435 |
| 4,347,919 | 9/1982 | Maeda | 74/435 |
| 4,358,804 | 11/1982 | Uehara | 360/105 |
| 4,571,459 | 2/1986 | Yata | 360/105 |

Primary Examiner—Robert S. Tupper
Assistant Examiner—Melissa J. Koval
Attorney, Agent, or Firm—Keith D. Beecher

[57] ABSTRACT

A control mechanism having particular, but not exclusive application to a cassette-type of telephone answering machine by which the movement of the record/playback head and pinch roller associated with each cassette of the machine, and the engagement of the drive for the take-up and rewind spindles of each cassette, are achieved by the rotational energy of the drive motor of the machine, rather than by high power electromagnetic solenoids; and in which only small, low power electromagnets are required for latching and unlatching the motor driven control mechanism.

5 Claims, 4 Drawing Figures

4,630,152

MECHANICAL DRIVE MECHANISM FOR THE RECORD/PLAYBACK HEAD AND PINCH ROLLER OF A CASSETTE-TYPE TELEPHONE ANSWERING MACHINE

This application is a continuation of copending application Ser. No. 572,835 filed Jan. 23, 1984. File is now abandoned.

BACKGROUND OF THE INVENTION

The control mechanism of the present invention finds particular application in a telephone answering machine which utilizes a first cassette-type tape unit on which an announcement message is recorded for transmission to a calling party during an itital time interval ($T_1$) upon the receipt of a ring signal; and which utilizes a second cassette-type tape unit for receiving messages from a calling party during a subsequent message recording interval ($T_2$). For each cassette, a record/playback head is mounted on a sliding plate together with a pinch roller, and for normal forward playback/record operation the plate is moved into its operative position such that the pinch roller presses the tape of the corresponding cassette against a motor driven capstan to cause the tape to be drawn from the supply reel to the take-up reel of the cassette; and such that the corresponding record/playback head is moved to a position adjacent to the tape in magnetically coupled relationship with the tape. In addition, when the sliding plate is moved into its operative position, a gear train couples the motor driven capstan to the take-up reel to rotate the take-up reel to enable it to wind up the tape.

For rewind operation, the sliding plate is released and is spring-biased to its standby position to move the record/playback head back from the tape and the pinch roller back from the capstan, and also to disengage the take-up reel from the capstan. At the same time, a further gear train couples the rewind reel of the cassette to the drive motor to cause the rewind reel to rotate in the opposite direction and rewind the tape.

It is usual in the prior art machines to provide an appropriate high-power electromagnetic solenoid in conjunction with each cassette to draw the corresponding sliding plate forward to its operational position against the bias of a return spring. It is also usual to provide a second electromagnetic solenoid in conjunction with each cassette to couple the drive motor to the rewind reel for the rewind operation. However, the electromagnetic solenoids used in the prior art apparatus of necessity are relatively large and expensive, and they draw relatively large electric currents, since it is necessary for each solenoid to exert a relatively large force on the controlled components in order to accomplish their desired purpose.

A control mechanism is described in U.S. Pat. No. 4,189,079 for use in a cassette-type telephone answering machine, in which the force for driving the sliding plate forward to its operational position against its spring bias, and the force for coupling the motor driven capstan to the rewind spindle of the capstan for the rewind operation, are provided by the main drive motor of the machine, rather than by high power electromagnetic solenoids. Relatively small, low power electromagnets are provided for latching and unlatching the mechanism which couples the drive motor to the sliding plate.

The mechanism of the present invention is of the same general type as described in U.S. Pat. No. 4,189,079. However, the mechanism of the present invention utilizes a different type of mechanical coupling between the motor and the sliding plate having a more positive action than the mechanism described in the patent.

SUMMARY OF THE INVENTION

In control mechanism of the present invention, movement of the record/play head and pinch roller for normal forward operation, is accomplished by using the rotational energy of the drive motor of the machine in which the control mechanism is installed. This is effectuated by means of an assembly including a gear and a rocker arm eccentrically coupled to the gear to pull a sliding plate on which the head and pinch roller are mounted into its operational position during normal operation of the machine. The assembly is controlled by a small, low powered electromagnet.

DETAILED DESCRIPTION OF THE ILLUSTRATED EMBODIMENT

Figure 1:
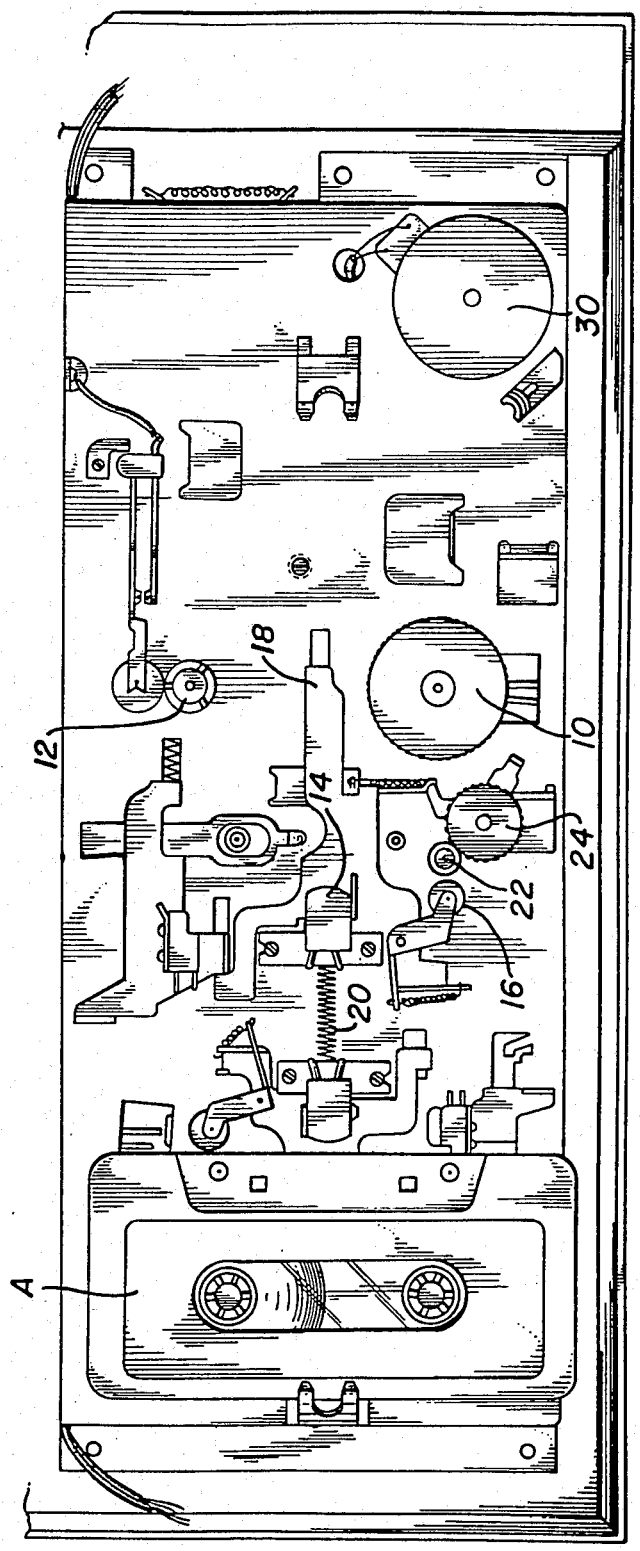
FIG. 1 is a top plan view of the chassis of a telephone answering machine in which the control mechanism of the invention may be incorporated.

In the plan view of FIG. 1 a cassette "A" is shown in place on the chassis of the machine. A second cassette has been removed so as to reveal the various components associated with the second cassette. In each instance, the components associated with both cassettes are generally the same, so the present description will be directed merely to the comppponents associated with the cassette that has been removed.

The foregoing components include, for example, a take-up reel turntable 10 and a rewind reel turntable 12 which respectively engage the take-up reel and rewind reel of the cassette, when it is in place. An electromagnetic record/playback head 14, and a pinch roller 16 are mounted on a carriage in the form of a sliding plate 18. The sliding plate 18 is normally biased to its standby position shown in FIG. 1 by a spring 20. However, when the machine is conditioned for normal play or record operation, the plate 18 is pulled to the right in FIG. 1 against the bias of spring 20 by the mechanism to be described, so as to draw the pinch roller against a motor driven capstan 22, and also to draw the head 14 into magnetically coupled relationship with the tape in the cassette.

The movement of plate 18 to the right in FIG. 1 also causes a spindle gear 24 to be drawn between a gear on capstan 22 and a gear on the take-up turntable 10 to cause the take-up reel in the cassette to be rotated in the forward direction. At the same time, the pinch roller 16 presses the tape in the cassette against capstan 22 and causes the tape to be drawn across the head 14.

Figure 2:
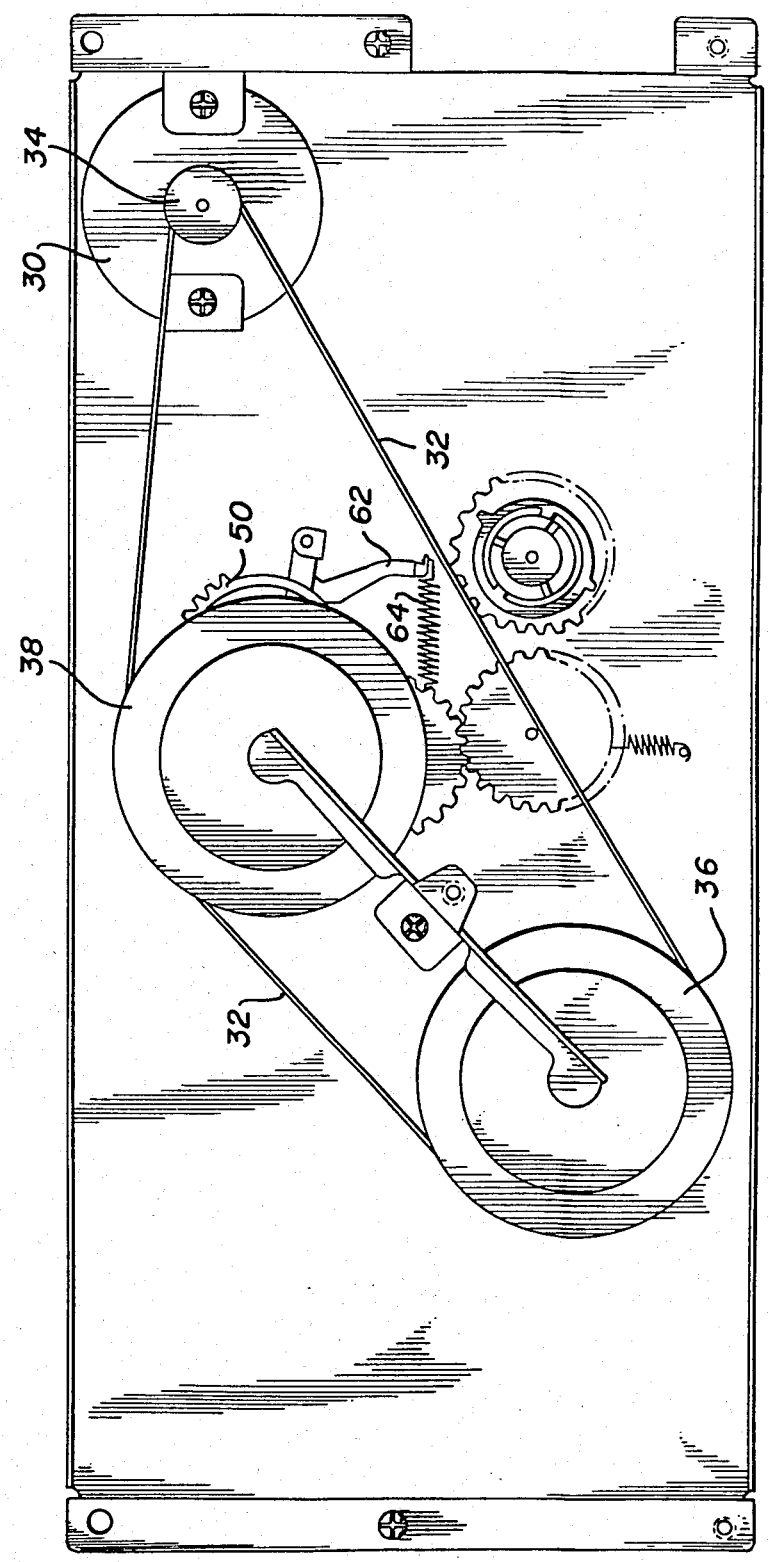
FIG. 2 is a bottom view of the chassis of FIG. 1.

Capstan 22 is operated by a drive motor 30 through a belt 32 (FIG. 2). The belt 32 is wound around a pulley 34 on the drive motor, and around flywheels 36 and 38, capstan 22 being mounted, for example, on flywheel 36 in coaxial relationship with the flywheel.

Figure 3:
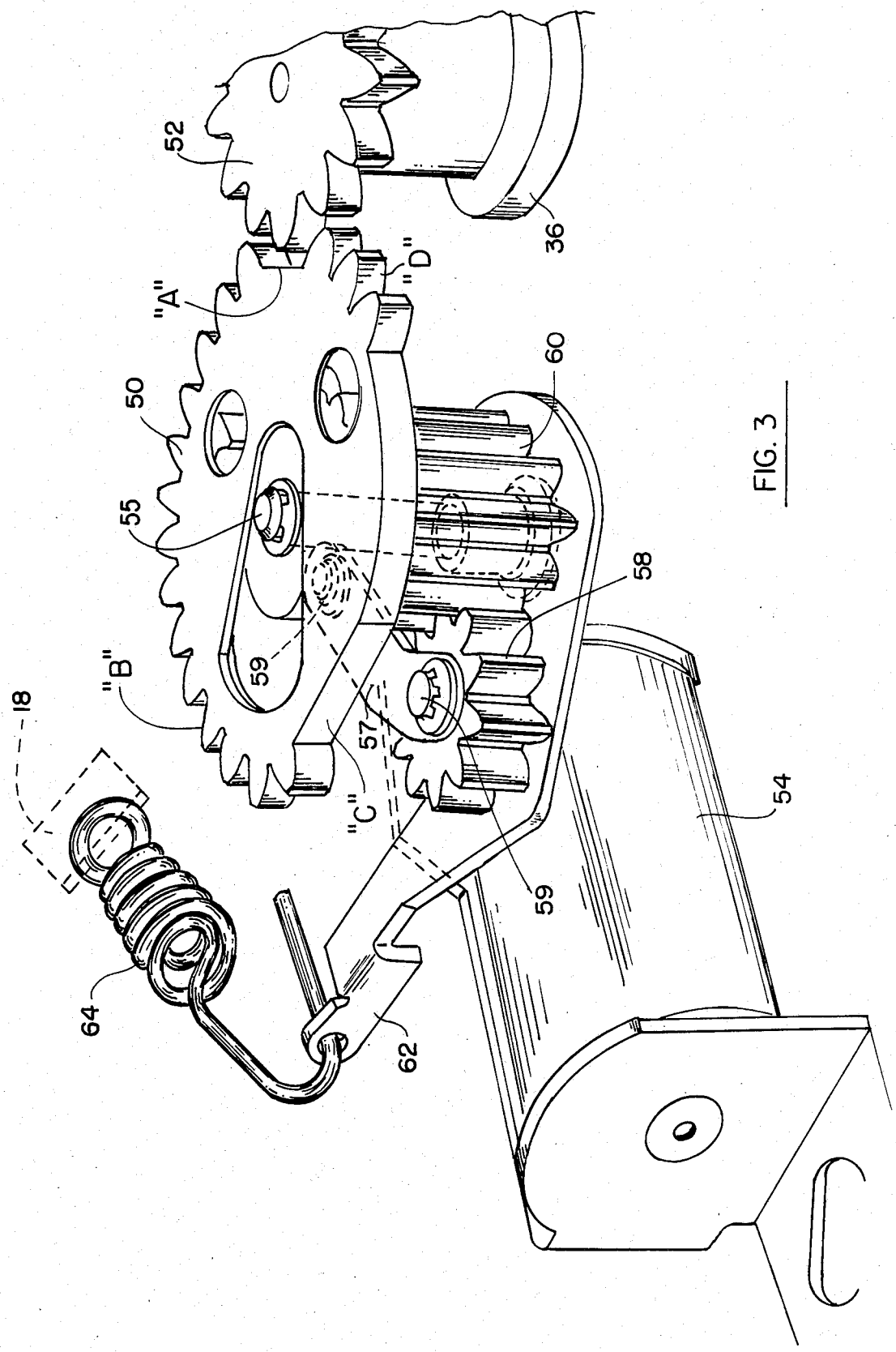
FIG. 3 is a perspective view of one embodiment of the control mechanism of the invention.
Figure 4:
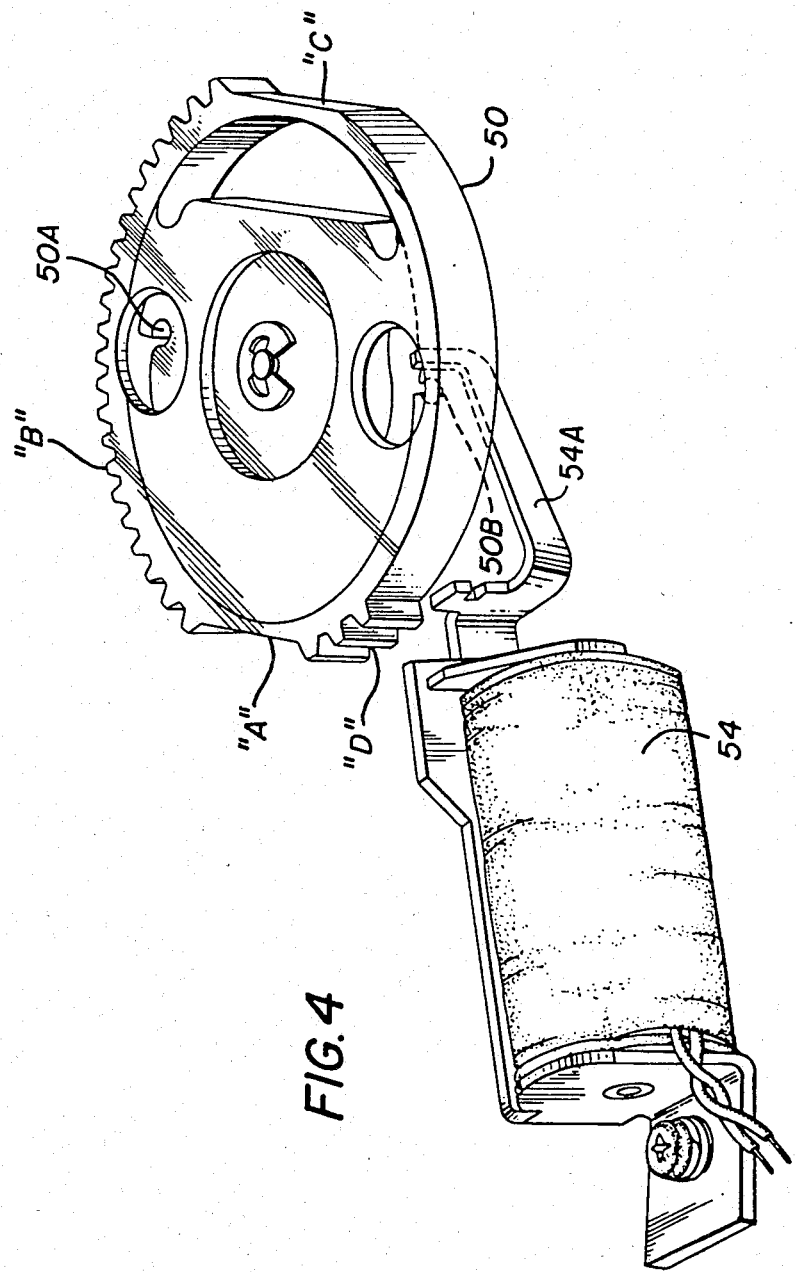
FIG. 4 shows the manner in which the control mechanism of FIG. 3 may be operated by an electromagnet.

The various components which are used to control movement of sliding plate 18 are shown in FIGS. 3 and 4. These components include a function gear 50 which is controlled by an electromagnet 54. When the electromagnet 54 is energized, function drive gear 50 is turned by a gear 52 mounted on the shaft of flywheel 36 of capstan 22, as shown in FIG. 3, to move plate 18 to its operative position. The plate then remains in its operative position so long as electromagnet 54 remains energized. When the electromagnet 54 is de-energized, the plate immediately moves back to its standby position by the action of spring 20 of FIG. 1.

As shown in FIG. 3, and as described above, drive gear 52 is mounted on the shaft of flywheel 36 of capstan 22, and which is driven by motor 30 through belt 32. Function gear 50 is rotatably mounted adjacent to gear 52. The function gear 50 has a first hiatus portion "A" which, when adjacent to the drive gear 52 de-couples the function gear from the drive gear. The drive gear also has gear teeth "B" extending around a relatively large arcuate portion of the function gear, and which when engaged by the drive gear 52 cause the function gear to rotate. The function gear also has a second hiatus portion "C", and a second series of teeth "D" extending around a smaller arc than the teeth "B". The hiatus portions "A" and "C" are angularly displaced from one another in the counterclockwise direction by 200°–220°.

A spur gear 60 is mounted coaxially with the function gear 50 and is affixed to the function gear. A crank gear 58 is mounted on a function arm 62, the function arm being pivoted at one end to a shaft 55 bearing the function gear 50 and the gear 60. The crank gear 58 includes an upright post 59 which is eccentrically mounted, and which is pivotally coupled to a crank link 57. The other end of the crank link is pivotally mounted to a post 59.

The distal end of function arm 62 is coupled to the sliding plate 18 of FIG. 1 through an override spring 64. When the function gear 50 is rotated, gear 60 rotates gear 58, causing the function arm 62 to move angularly about the axis of the function gear due to the action of crank link 57 and the eccentric post 59. When the function arm 62 moves in a counterclockwise direction about the pivot axis, it pulls the sliding plate 18 into its operative position through the limit spring 64.

When the electromagnet 54 of FIG. 4 is energized, the end of its armature 54A is released from a notch 50A in function gear 50 thereby releasing the function gear. The crank gear 58, as mentioned above, then causes the function gear to turn slightly so that notch "A" moves relative to drive gear 52, and the drive gear 52 engages the end of the larger segment of gear teeth "B" on the function gear 50. The drive gear 52 now turns the function gear 50 causing the crank gear 58 to turn and move the function arm 62 in a counterclockwise direction so that plate 18 is pulled into its operative position through the override spring 64. When the plate 18 is in its operative position, the record/playback head 14 of FIG. 1 is moved against the tape in the cassette, the pinch roller 16 is moved against the capstan 22 to drive the tape, and gear 24 couples the capstan to the take-up reel 10 so that the tape may be drawn across the head 14.

So long as electromagnetic 54 is energized, the function gear 50 continues to be turned by the drive gear 52 until the drive gear reaches the end of the larger segment "B" of gear teeth. The drive gear 52 then is positioned in notch "C" and no further rotation of the function gear 50 occurs. The rotation of the function gear as drive gear 52 moves from one end of the large segment "B" of gear teeth to the other corresponds to a displacement of the end of function arm 62 sufficient to draw sliding plate 18 into its operative position, at which time the rotation of the function gear 50 is terminated.

At that time, the end of the armature 54A of electromagnet 54 enters notch 50B of FIG. 4, and so long as the electromagnet 54 remains energized, its armature latches the function gear 50, and prevents rotation of the function gear, so that the function arm 62 holds the sliding plate 18 in its operative position. At that time, the drive gear 52 is adjacent to the toothless notch "C" of the function gear 50 so that the function gear remains stationary, and the slide plate 18 is latched in its operative position, even though the drive gear continues to rotate.

When the electromagnet 54 is subsequently deenergized, the end of its armature 54A is released from notch 50B in FIG. 4, releasing the function gear 50, so that spring 20 of FIG. 1 is able to draw the slide plate 18 back to its standby position. This action turns the function gear 50 slightly, enabling drive gear 52 to engage the small tooth segment "D" of the function gear, turning the function gear back to its original position, at which the notch "A" faces the drive gear 52, so that there is no further turning of the function gear, even though the drive gear 52 continues to rotate. Accordingly, the sliding plate 18 is now held in its standby position by the bias of spring 20 until the electromagnet 54 is next energized, so that the cycle may be repeated.

The function of drawing the sliding plate 18 to its operative position is performed by the drive motor 30, rather than by a high power electromagnet solenoid, as was the usual procedure in the prior art.

It will be appreciated that while a particular embodiment of the invention has been shown and described, modifications may be made. It is intended in the claims to cover all modifications which come within the spirit and scope of the invention.

What is claimed is:

1. A mechanism for selectively moving a carriage from a standby position to an operative position, said mechanism including: a supporting frame; a drive motor mounted on said frame; a drive gear rotatably mounted on said frame; means coupling said drive gear to said drive motor to cause said drive gear to be rotatably driven thereby; a function gear mounted on said supporting frame for rotation about an axis displaced from the axis of rotation of said drive gear, said function gear having teeth extending partially around the periphery thereof in position to be engaged by said drive gear for selected angular positions of said function gear, said function gear being disengaged from said drive gear for other angular positions thereof; an arm movable pivotally about the axis of rotation of said function gear; means coupling the distal end of said arm to said carriage; a third gear rotatably mounted about the axis of rotation of said function gear coaxially with said function gear and affixed to said function gear; a fourth gear rotatably mounted on said arm in position to be driven by said function gear; and a crank link having one end pivotally mounted on said frame and having its other end eccentrically coupled to said fourth gear to cause said arm to move angularly in a reciprocal manner as said fourth gear rotates.

2. The combination defined in claim 1, and which includes electromagnetic means having an armature in latching relationship with said function gear to latch said function gear in a first angular position when said electromagnetic means is energized and to latch said function gear in a second angular position when said electromagnetic means is de-energized, said function gear being disengaged from said first gear in both said first and second angular positions.

3. The combination defined in claim 1, and which includes resilient means connected to said frame and to said carriage for biasing said carriage to its standby position.

4. In a telephone answering machine which includes: a chassis; means mounted on said chassis for receiving a removable magnetic tape cassette; a capstan drive rotatably mounted on said chassis for driving the tape in said cassette; a drive motor mounted on said chassis; means coupling said drive motor to said capstan drive; a movable carriage mounted on said chassis; a pinch roller assembly mounted on said movable carriage; a magnetic head mounted on said movable carriage; and resilient means coupled to said chassis and to said carriage for biasing said carriage to a standby position in which said pinch roller assembly is displaced from said capstan and said head is displaced from said tape; a mechanism for selectively moving said carriage from its standby position to an operative position in which said pinch roller presses said tape against said capstan and said magnetic head is placed in magnetically coupled relationship with said tape, said mechanism including: a drive gear rotatably mounted on said chassis to be driven by said drive motor; a function gear rotatably mounted on said chassis and having teeth extending partially around the periphery thereof in position to be engaged by said drive gear for selected angular positions of said function gear, and with said function gear being disengaged from said drive gear for other angular positions thereof; an arm mounted for pivotal movement about the axis of rotation of said function gear; means coupling the distal end of said arm to said carriage; a third gear affixed to said function gear for rotation with said function gear about the axis of rotation thereof; a fourth gear rotatably mounted on said arm in position to be driven by said function gear; and a crank link having one end pivotally mounted to said chassis and having its other end eccentrically coupled to said fourth gear to cause said arm to move angularly in a reciprocal manner about the axis of rotation of said function gear as said fourth gear rotates.

5. The combination defined in claim 4, and which includes electromagnetic means mounted on said chassis having an armature in latching relationship with said function gear to latch said function gear in a first angular position when said electromagnetic means is energized and for latching said function gear in a second angular position when said electromagnetic means is deenergized, said function gear being disengaged from said drive gear in both said first and second angular positions.

* * * * *